Nov. 17, 1964
H. WOHLMUTH
3,157,085
DIE PATTERN
Filed Sept. 11, 1962
3 Sheets-Sheet 1
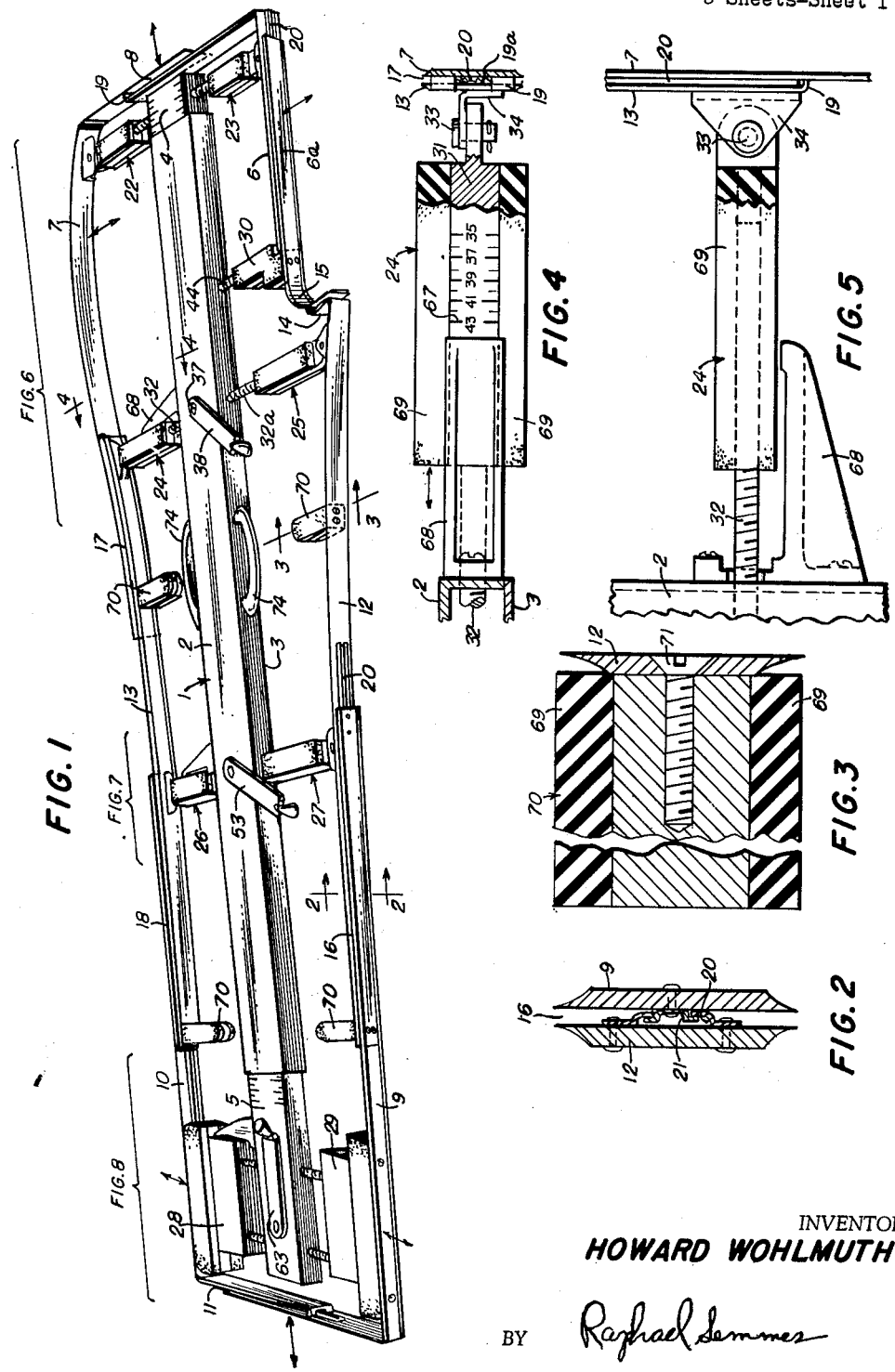
INVENTOR
HOWARD WOHLMUTH
BY *Raphael Semmes*
ATTORNEY

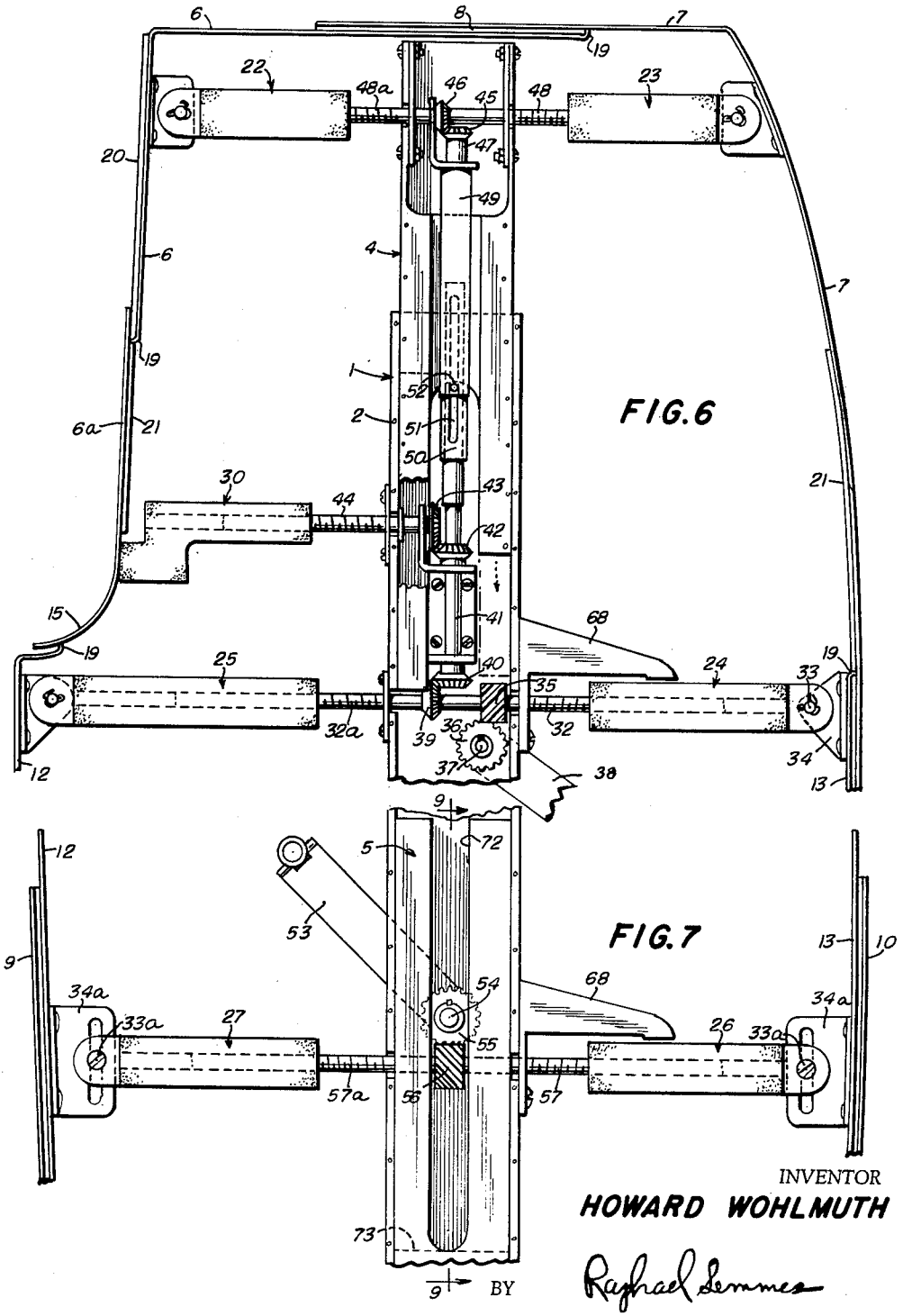

Nov. 17, 1964   H. WOHLMUTH   3,157,085
DIE PATTERN

Filed Sept. 11, 1962   3 Sheets-Sheet 3

INVENTOR
HOWARD WOHLMUTH

BY *Raphael Semmes*

ATTORNEY 3,157,085
DIE PATTERN
Howard Wohlmuth, 6802 Cross Country Blvd., Baltimore 15, Md.
Filed Sept. 11, 1962, Ser. No. 222,899
6 Claims. (Cl. 83—657)

This invention relates to adjustable cutting dies, and consists more particularly in new and useful improvements in a die pattern especially designed for use in the manufacture of articles of clothing such as pants, which have heretofore required time-consuming effort in making the necessary adjustments and variations of a basic pattern to suit the measurements of a particular individual.

Conventionally, an original pattern of a selected style developed by a pattern designer requires certain modifications as to length, width, rise, and various measurements to suit the individual for whom the pants, for example, are being made. When the cloth is laid out for cutting, the final pattern is used to mark the cloth, which is then cut either by scissors or other cutting machines, during which operation errors are often made, either in the drawing of the pattern or in undertaking to adjust it with the grade. Also, during the cutting operation, the cutter, in some instances, fails to accurately follow the line so that the cloth as finally cut is inaccurate.

It is the primary object of the present invention to provide a die pattern which is basically shaped to form a particular portion of any article of cloth or other suitable material, such, for example, as the front or the back portion of a pair of pants, and is adjustable to provide the required measurements for seat, knee, cuff, rise and waist, both as to width and length, and, at the same time, designed to effect the necessary variations in profile contour to compensate for such variations in length and width.

Another object of the invention is to provide an adjustable die pattern of this type having cutting edges of resilient strip steel of razor-edge sharpness and adapted to be placed upon one or more layers of cloth to cut a selected pattern under the force of a heavy press or the like, the resilient strip steel cutting elements automatically adjusting themselves to provide the required contours to compensate for length and width adjustments of the overall die pattern.

Another object of the invention is to provide an adjustable die pattern for use in a heavy press or the like, including stabilizing blocks to avoid distortion of the spring steel cutting elements under pressure.

Still another object of the invention is to provide a die pattern including a telescoping adjustment of the cutting elements which are arranged in overlapping relation at adjacent extremities and including means for maintaining a predetermined uniform spacing or gap between the overlapping portions to avoid the collection of shredded material which would otherwise lodge between the blades and force them apart.

A further object of the invention is to provide a die pattern wherein the connections between the main frame of the die and the spring steel or other flexible metal cutting elements are pivotal and/or slotted to facilitate the attainment of a smooth curve between the points of attachment without localized flat spots which would occur with rigid attachments to the cutting elements.

A further object is to permit freedom in longitudinal movement of the cutting elements between the transverse points of attachment due to the lengthening or shortening action along the cutting elements as the transverse adjustments are varied, thus precluding bending with resultant high operating loads of the transverse operating mechanism.

A still further object of the invention is to provide an adjustable die pattern wherein the adjustment of one area automatically adjusts a related area so as to produce a finished pattern having the required contours.

With the above and other objects in view which will appear as the description proceeds, the invention consists in the novel features herein set forth, illustrated in the accompanying drawings and more particularly pointed out in the appended claims.

Referring to the drawings in which numerals of like character designate similar parts throughout the several views:

FIG. 1 is an overall perspective view of a die pattern formed in accordance with the invention;

FIG. 2 is an enlarged sectional view taken on line 2—2 of FIG. 1;

FIG. 3 is a similar view taken on line 3—3 of FIG. 1;

FIG. 4 is a sectional view taken on line 4—4 of FIG. 1 and illustrating one of the supporting block members;

FIG. 5 is a top plan view of the element shown in FIG. 4;

FIG. 6 is an enlarged plan view of the bracketed area indicated in FIG. 1, but taken from the reverse side of the die pattern;

FIG. 7 is a similar view of the indicated bracketed area of FIG. 1;

Figure 8:
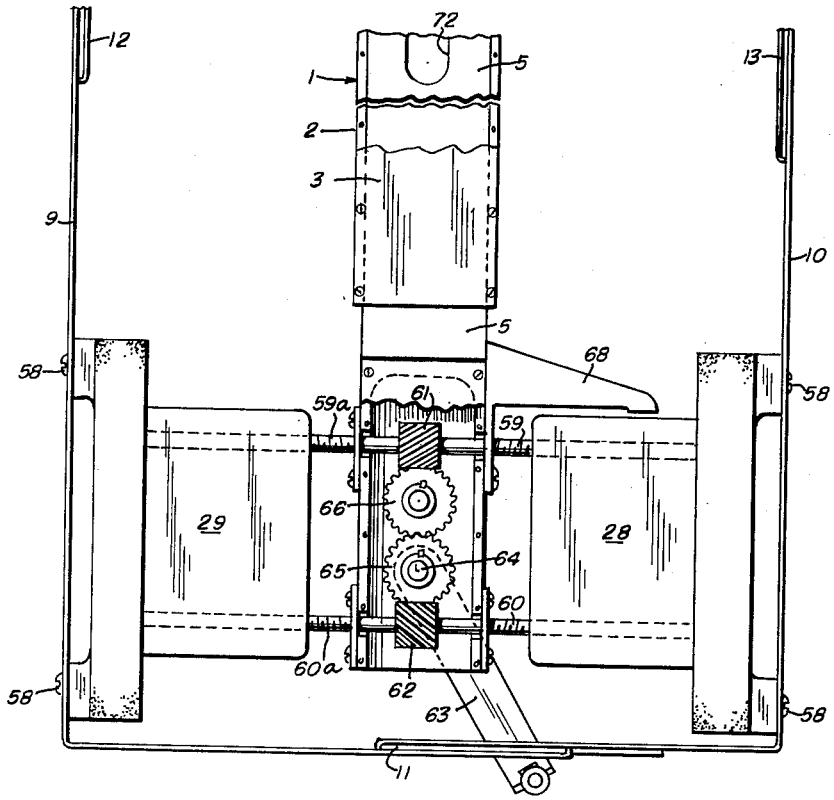
FIG. 8 is a similar view of the indicated bracketed area of FIG. 1.

In the drawings, FIG. 1 illustrates the overall die pattern which, in the form shown, represents the pattern for one front portion of a pair of pants. Here it will be seen that the assembly comprises a central longitudinally extending support member generally indicated by the numeral 1, and consisting of a central housing 2 in the form of an inverted channel, the lower side of which is closed by a closure plate 3. The housing 2 is open at its opposite longitudinal extremities to slidably receive telescoping support bars 4 and 5 for the top and bottom portions respectively of the die pattern. The particular structure of the central support member 1 will be described more in detail later on.

The cutting elements of the die pattern comprise a series of complementary strips of relatively thin spring steel or other suitable metal having the desired flexibility and of substantially razor-sharpness along both upper and lower longitudinal edges, said strips being shaped to collectively define the basic contour of the desired pattern, with adjacent ends of respective strips arranged in overlapping, sliding relation so as to enable telescopic adjustment, both as to length and width, as will later appear. More specifically, the cutting assembly comprises a pair of upper area cutting strips 6 and 7, respectively contoured to define the boundaries of the rise of the pattern, said strips being bent inwardly at substantially right angles at the top or waist of the pattern with their ends overlapping as at 8 to provide for adjustment as to width. To accommodate longitudinal adjustment, a second cutting strip 6a overlaps strip 6 and is slidably connected thereto as will be described.

Similarly, the bottom portion of the cutting assembly comprises a pair of cutting strips 9 and 10, contoured to define the inner seam and outer seam boundaries respectively of the pattern, and also bent inwardly at substantially right angles at their lower extremities where they overlap as at 11. Between the upper strips 6, 6a–7 and the lower pair of strips 9–10, and contiguous therewith, are an intermediate pair of cutting strips 12 and 13 which are generally contoured to complete the inner and outer seam boundaries at the intermediate portion of the pattern. One end of strip 12 is bent inwardly at an angle as at 14 and overlaps an adjacent oppositely curved portion 15 of strip 6a to jointly form therewith the crotch portion of the pattern, the overlapping relation permitting the necessary adjustment, as will later appear. The opposite end of strip 12 overlaps the adjacent end of strip 9 as at 16 and opposite ends of the other intermediate strip 13 overlap the corresponding extremities of strips 7 and 10 as at 17 and 18.

The means for securing the cutting assembly to the central support member 1 and the means for effecting the various adjustments of the pattern will be described later on, but in the interest of continuity, the particular relationship of the respective cutting strips should be noted. As previously pointed out, it is important that the overlapping portions of the respective cutting strips be maintained in transversely spaced relation so as to prevent shredded material from becoming lodged between the blades or strips to ultimately force them apart when pressure is applied. Ordinarily, this spacing or gap is from 1/16 of an inch to 3/32 of an inch, which has been found satisfactory in that it allows the string of unwanted material to remain with the waste material without becoming lodged between the blades. This spacing is accomplished first by providing an angularly bent spacing flange 19 at an extremity of one overlapping strip which abuts the opposed surface of the adjacent strip and is of a depth to provide the required gap, as best seen in FIG. 6, for example. In addition, and in order to insure that the overlapping cutting strips operate and change contour in perfect accord and unison, the overlapping strips are provided with a guide track and tongue arrangement which not only maintains the required gap between the cutting edges of the strips, but retains the overlapping areas of respective strips in uniform relation to one another, both during longitudinal and lateral adjustment thereof.

Referring to FIGS. 1 and 2, each of the underlying strips is provided with a trackway 20 which extends longitudinally of the strip for a length to afford the required adjustment, and within this trackway a complementary tongue strip 21, secured to the adjacent overlying strip, is adapted to slide longitudinally. Thus, upon the longitudinal telescoping adjustment of adjacent strips, the entire overlapping areas of the strips are retained in uniformly spaced relation, regardless of the curvature or contour to which the strips are adjusted. In this connection, in order to accommodate these guideways, the spacing flanges 19 are preferably recessed intermediate their ends as at 19a as seen in FIG. 4.

As seen in FIGS. 6, 7 and 8 taken in conjunction with FIG. 1, the overall cutting assembly is connected to the central support member 1 at longitudinally spaced intervals by a series of connecting blocks arranged on opposite sides of the central support member 1 between the latter and the inner faces of the various cutting elements. These blocks are generally arranged in opposed pairs, and in addition to acting as connectors for the cutting assembly, they also coact with the adjustment mechanism hereinafter described to cause the lateral expansion and contraction of selected areas of the cutting assembly. One pair of blocks 22 and 23 are arranged at the waist end of the pattern, another pair, 24 and 25, are arranged in the area of the rise or hip portion of the pattern, another pair, 26 and 27, substantially at the knee portion, and a fourth pair, 28 and 29, are arranged substantially at the ankle portion. An additional single block 30 is preferably located between the central support member and the crotch cutting element of the pattern.

As these connecting blocks are substantially the same in construction, a description of one will suffice. For example, as seen in FIG. 4, the block 24 preferably consists of a metal casting 31, longitudinally drilled and threaded from one end to receive a screw shaft 32 which extends through the adjacent side wall of the housing 2 of the central support member. The opposite end of each block is pivotally connected as at 33 to a lug 34 which is secured to the inner face of an adjacent cutting element, in this instance the spring strip 13. This pivotal connection affords a degree of floating action during the adjustment of the elements of the cutting assembly.

Returning to the screw shaft 32, it will be seen in FIG. 6 that this shaft continues through the housing 2 and its opposite portion 32a operatively engages complementary threads in a bore in the opposite block 25. Within the housing 2, the shaft 32–32a is provided with one gear 35 which meshes with a complementary gear 36 on a short shaft 37 which extends through the top wall of the housing with its outer end connected to a crank arm 38. Thus, rotation of the crank arm and gear 36 causes rotation of the shaft 32–32a to either project or retract the blocks 24–25 for a selected adjustment of the cutting assembly.

For a coordinated adjustment of the pattern, it is desirable that certain other areas of the cutting assembly be correspondingly adjusted simultaneously with the adjustment of the areas connected to the blocks 24 and 25. This is accomplished by providing a bevel gear 39 on the combined shaft 32–32a within the channel of the housing, adapted to mesh with a complementary bevel gear 40 carried on the end of a longitudinally extending shaft 41. This shaft carries another bevel gear 42 which meshes with a bevel gear 43 carried at the inner end of a laterally projecting screw threaded shaft 44 which extends through the wall of the housing and operatively engages complementary threads in a bore in connecting block 30. Thus, simultaneously with the adjustment affected by the blocks 24 and 25, the cutting elements 6 and 6a are correspondingly adjusted.

The simultaneous adjustment of the waist area of the pattern through blocks 22 and 23 is effected in a similar manner by providing meshing bevel gears 45 and 46 respectively carried by an extension 47 of the shaft 41 and the laterally extending combined shaft 48–48a. It will be apparent that rotation of the shaft extension 47 causes the projection or retraction of the blocks 22 and 23 coincident with the adjustment of blocks 24, 25 and 30.

In order to accommodate the telescoping action of the support bar 4 with respect to the housing 2, the shaft extension 47 is connected to the shaft 41 by a set of telescoping sleeves 49 and 50, the latter being provided with a longitudinal slot 51 which coacts with a pin 52 in sleeve 49 to insure rotation of shaft section 47 with shaft 41, regardless of the projection or retraction of support bar 4.

The intermediate area of the trouser leg portion of the die pattern is adjusted in a generally similar manner through blocks 26 and 27. A crank arm 53 is connected to the projecting end of a short shaft 54 extending through the top wall of the housing and carrying within the housing a gear 55 which meshes with a complementary gear 56 on a combined screw shaft 57–57a, the respective sections of which engage the threads in bores in blocks 26 and 27. Preferably, the outer ends of the blocks 26 and 27 are pivotally mounted as at 33a in slotted lugs 34a fixed to the adjacent cutting elements. This facilitates the uniform adjustment of this area of the pattern and compensates for certain contour changes affected by the overall adjustment of the cutting assembly.

The cuff or ankle area connecting blocks 28 and 29, as best seen in FIG. 8, are secured to the cutting elements 10 and 9, respectively, by any suitable means such as screws 58, and these blocks are drilled and threaded at spaced points in their opposed edges to receive combined screw shafts 59–59a and 60–60a which extend through the housing 2 and are provided with gears 61 and 62, respectively. An adjusting crank 63 is mounted on a short shaft 64 carrying a gear 65 which meshes both with the gear 62 and a connecting gear 66, which latter gear meshes with gear 61 on the other screw shaft 59–59a. Thus, rotation of the crank 63 causes the simultaneous projection or retraction of both ends of each of the connecting blocks 28 and 29.

In this connection, it will be noted that with the exception of the cuff or ankle area, wherein the cutting elements are rigidly connected between the spaced points 53, the contour of the blades or cutting elements changes with adjustment. The rigid connection is provided at the cuff to prevent any alteration of the contour of this localized area, other than the width thereof.

In order to insure accurate adjustment of the die pattern, both longitudinally and laterally, the telescoping support bars 4 and 5 of the central support member are calibrated as shown in FIG. 1, and at least one of each pair of connecting blocks is similarly calibrated. For example, as shown in FIG. 4, the casting 31 is calibrated as at 67 to coact with an indicating arm 68 fixed to the side wall of the housing 2. Similar indicating means are provided at the various adjustable areas of the pattern.

As previously stated, this die pattern is used in connection with a heavy press and in order to avoid distortion of the thin spring steel cutting strips under pressure, each of the connecting blocks as shown in FIGS. 4 and 5 is provided on its upper and lower faces with resilient rubber pads or the like 69. These pads are of a thickness to extend slightly beyond the cutting edges on opposite sides of the cutting assembly so as to receive the actual pressure force of the platen of the press and distribute said force throughout the pattern. In addition, it is advisable to provide a series of supplemental pressure receiving blocks 70 projecting inwardly from selected points throughout the pattern area. For example, as shown in FIG. 3, these blocks which are not connected to the central support member, are secured by screws or the like 71 to the inner faces of selected cutting elements such as 12, and are provided on both faces with cushion pads 69.

Although not shown in the drawings, in addition to the coordinated adjusting mechanisms, certain areas of the pattern, such, for example, as the waist area, may require independent adjustments of a minor nature. This can be easily accomplished by providing separate adjusting mechanisms in these areas.

Figure 9:
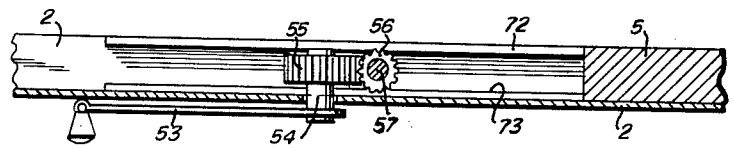
FIG. 9 is a fragmentary sectional view taken on line 9—9 of FIG. 7, illustrating the gear accommodating slot arrangement.

The channel 2 and the telescoping support bars 4 and 5 are suitably recessed and slotted to accommodate the fixed gears which actuate the adjusting mechanisms during the telescoping adjustments. For example, by reference to FIGS. 7 and 9, it will be seen that the inner end of the lower telescoping support bar 5 is provided with intersecting slots 72 and 73 extending longitudinally in bar 5 and arranged to accommodate the gears 55 and 56. In other words, during longitudinal movement of bar 5, the slot 72 accommodates the periphery of the gear 56, and the slot 73 accommodates the periphery of the gear 55. Similar slots and recesses are provided throughout the central support member and its telescoping support bars to accommodate the other gears, but specific reference thereto is believed unnecessary to an understanding of the invention.

It may be pointed out that the primary advantage of providing double edged cutting elements resides in the adaptability of the die pattern for maximum utilization of the materials being cut. For example, it has been found that by reversing the position of a die pattern between cutting operations, the operator is enabled to so place the pattern as to avoid unnecessary waste of material. This will be readily apparent to one skilled in this field. Also, to facilitate the lifting and manipulation of the die pattern, it is preferable to provide suitable handles such as at 74 in FIG. 1.

It will thus be seen that the present invention provides a very efficient and easily operable cutting die pattern which, while primarily designed for use in the cutting of trouser parts, can be readily adapted for various cutting operations and for use with a wide variety of materials.

Figure 10:
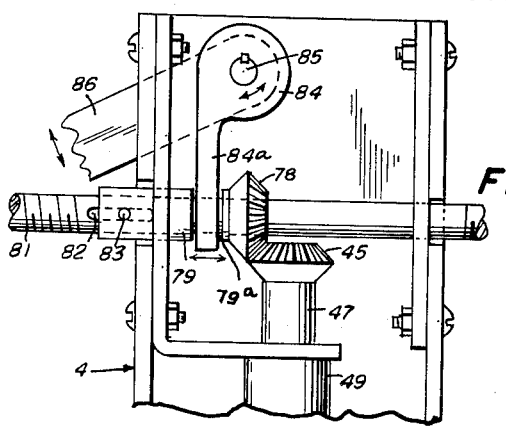
FIG. 10 is an enlarged fragmentary view of a modified form of selective adjusting mechanism.

As previously pointed out, separate adjusting mechanisms may be provided in areas such as the waist area which is not coordinated with the main adjustment mechanism. For example, in FIG. 10, the previously described gear 46 is replaced by a gear 78 fixed to a clutch sleeve 79 which is slidably mounted on the screw shaft 81, the latter replacing the screw shaft 48, 48a. This sleeve 79 is provided with a key 83 which slidably embraces a longitudinal slot 82 in shaft 81 and is thus rotatable with the shaft.

As seen in the drawing, the sleeve 79 is provided with a peripheral recess 79a which is engaged by the bifurcated end of an arm 84a carried by a rotatable element 84 pivoted to the frame at 85. An arm 86 is keyed to the pivot shaft 85 to effect adjustment of the gear 78. Thus, when the arm 86 is moved in clockwise direction, this movement is transmitted through element 84 and bifurcated arm 84a to the sleeve 79, sliding the latter to the left in FIG. 10 to disengage gear 78 from gear 45. Counterclockwise movement of the arm 86 causes re-engagement of these two gears.

In operation, when it is desired to disconnect the waist adjustment area from coordinated adjustment with the main adjusting mechanism, this is accomplished by simply rotating the arm 86 in clockwise direction. When disconnected in this manner, the gear 78 may be independently rotated by any suitable means (not shown).

While the drawings and specification are directed to a particular type of adjusting mechanism for controlling the measurements and contour of the die pattern, it is to be understood that the invention is not limited in this respect, as various types of adjustments may be employed with equal effect. It may also be noted that electronically controlled adjusting mechanisms are contemplated for use in connection with a die pattern embracing the essential features of the invention.

From the foregoing, it is believed that the invention may be readily understood by those skilled in the art without further description, it being borne in mind that numerous changes may be made in the details disclosed without departing from the spirit of the invention as set forth in the following claims.

I claim:

1. A cutting die pattern comprising a central longitudinally adjustable support member formed of sections arranged in longitudinal telescoping relation, a cutting assembly surrounding said support member and defining a predetermined basic pattern contour, said cutting assembly being formed by a series of contiguous, flexible, double-edged cutting strips respectively arranged with adjacent portions in overlapping, telescoping relation, said overlapping portions being slidably connected in laterally spaced relation by coacting guideways and tongue strips respectively mounted on and between their opposed faces, lateral connecting members longitudinally spaced on opposite sides of said central support member extending between respective telescoping sections of the latter and corresponding telescoping elements of said cutting assembly, respective connecting members including mechanisms for adjusting the spacing of selected areas of said cutting assembly from said support member and varying the bounding contour of said cutting assembly.

2. A cutting die pattern as claimed in claim 1, wherein said cutting assembly includes a crotch portion formed by oppositely bent, overlapping extremities of two of said cutting strips, said overlapping extremities being relatively slidable to compensate in the crotch portion for adjustment of the adjacent areas of said cutting assembly.

3. A cutting die pattern as claimed in claim 1, wherein the overlapping extremities of certain cutting strips are provided with intervening spacing means which coact with said guideways and tongue strips to maintain the lateral spacing of adjacent cutting strips.

4. A cutting die pattern as claimed in claim 1, including means operatively connecting the adjustment mechanisms of certain areas to those of certain other areas for coordinated adjustment.

5. A cutting die pattern as claimed in claim 1, including supporting blocks attached to the cutting assembly and provided on opposite horizontal surfaces with resilient pads which project slightly beyond the corresponding edges of said cutting assembly.

6. A cutting die pattern as claimed in claim 1, wherein said lateral connecting members include support blocks provided on opposite horizontal surfaces with resilient pads which project slightly beyond the corresponding edges of said cutting assembly.

References Cited by the Examiner

UNITED STATES PATENTS

| 456,286 | 7/91 | Denzer | 33—177 X |
|---|---|---|---|
| 2,211,213 | 8/40 | Lindholm | 83—652 |
| 2,214,743 | 9/40 | Lamb | 83—652 X |
| 3,111,877 | 11/63 | Rugenstein | 83—657 |

FOREIGN PATENTS

| 4,004 | 8/34 | France. |
|---|---|---|
| 245,350 | 8/10 | Germany. |
| 19,223 | 8/11 | Great Britain. |

LEON PEAR, *Primary Examiner.*